(12) United States Patent
Cone et al.

(10) Patent No.: US 8,069,666 B1
(45) Date of Patent: *Dec. 6, 2011

(54) SYSTEM FOR GENERATING SHAFT HORSEPOWER USING WASTE HEAT

(75) Inventors: Robert E. Cone, Houston, TX (US); Mitzi Jones Gass, Missouri City, TX (US); Matthew Wayne Wishert, Magnolia, TX (US)

(73) Assignee: Maxim Silencers, Inc., Stafford, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/712,356

(22) Filed: Feb. 25, 2010

(51) Int. Cl.
| F01K 23/10 | (2006.01) |
| F01N 3/10 | (2006.01) |
| F01N 3/02 | (2006.01) |
| F01N 5/02 | (2006.01) |
| F01N 1/14 | (2006.01) |
| F03G 7/00 | (2006.01) |
| F02K 1/00 | (2006.01) |

(52) U.S. Cl. ............. 60/618; 60/299; 60/320; 60/641.3; 181/220

(58) Field of Classification Search .......... 60/618, 60/641.3, 649, 651, 653, 671, 299, 301–304, 60/312, 317–319, 320–321, 324, 39.181–39.182, 60/39.55; 181/220, 230–231, 240, 248–249
See application file for complete search history.

(56) References Cited

U.S. PATENT DOCUMENTS

| 3,231,016 | A | * | 1/1966 | Stewart et al. ............... 165/164 |
| 3,280,903 | A | * | 10/1966 | Stoddard, Jr. ................... 60/320 |
| 4,213,302 | A | * | 7/1980 | Woinsky ...................... 60/641.3 |
| 4,334,409 | A | * | 6/1982 | Daugas .......................... 60/618 |
| 4,341,077 | A | * | 7/1982 | Woinsky ...................... 60/641.3 |
| 4,426,844 | A | * | 1/1984 | Nakano ........................... 60/299 |
| 4,579,194 | A | * | 4/1986 | Shiki et al. .................... 181/262 |
| 4,601,168 | A | * | 7/1986 | Harris ............................ 60/299 |
| 4,733,536 | A | * | 3/1988 | DiBella et al. ................ 60/618 |
| 5,016,438 | A | * | 5/1991 | Harris ............................ 60/299 |
| 5,162,620 | A | * | 11/1992 | Ross et al. .................... 181/220 |
| 5,184,464 | A | * | 2/1993 | Harris ............................ 60/299 |
| 5,218,817 | A | * | 6/1993 | Urata ............................. 60/299 |
| 5,609,029 | A | * | 3/1997 | Ahnger et al. ................. 60/618 |
| 5,896,740 | A | * | 4/1999 | Shouman .................. 60/39.182 |
| 6,213,827 | B1 | * | 4/2001 | Hattori et al. .............. 440/89 R |
| 7,282,185 | B2 | * | 10/2007 | Harris .......................... 181/264 |
| 7,458,217 | B2 | * | 12/2008 | Kalina ............................ 60/618 |
| 7,487,633 | B2 | * | 2/2009 | Popik et al. .................... 60/299 |
| 7,637,108 | B1 | * | 12/2009 | Langson ......................... 60/618 |
| 2005/0163677 | A1 | * | 7/2005 | Galligan et al. .............. 422/180 |
| 2006/0054381 | A1 | * | 3/2006 | Takemoto et al. ............ 181/237 |
| 2007/0056284 | A1 | * | 3/2007 | Kalina ............................ 60/618 |
| 2008/0011160 | A1 | * | 1/2008 | Bowman et al. .................. 96/4 |
| 2008/0134895 | A1 | * | 6/2008 | Ruud et al. ......................... 96/9 |
| 2009/0038302 | A1 | * | 2/2009 | Yamada et al. ................ 60/320 |
| 2010/0043413 | A1 | * | 2/2010 | Orihashi et al. ............... 60/320 |

* cited by examiner

Primary Examiner — Thai Ba Trieu
(74) Attorney, Agent, or Firm — Buskop Law Group, PC; Wendy Buskop

(57) ABSTRACT

One or more systems for generating shaft horsepower by using waste heat from combustion exhaust are provided herein. The system can include a heat recovery silencer, a turbine, a compressor, a combustion source, and a control system.

18 Claims, 6 Drawing Sheets

SYSTEM FOR GENERATING SHAFT HORSEPOWER USING WASTE HEAT

FIELD

The present embodiments generally relate to a system for producing electricity by using a heat recovery silencer.

BACKGROUND

A need exists for a system capable of producing electricity by using a heat recovery silencer that can recover waste heat from a first combustion system in an efficient manner.

A further need exists for an energy production system that can use a heat recovery silencer to acquire waste heat from a combustion source that performs a first process and using the waster heat to create electricity for another process without the need for a second combustion system, thereby eliminating any unnecessary emissions. Furthermore, there is a need for a system that utilizes an efficient heat recovery silencer that eliminates the need for multiple combustion systems to prevent unnecessarily unsafe working conditions.

In addition, there is a need for a system that utilizes a heat recovery silencer that muffles or silences a sound emanating from the exhaust system of the first combustion system.

The present embodiments meet these needs.

BRIEF DESCRIPTION OF THE DRAWINGS

The detailed description will be better understood in conjunction with the accompanying drawings as follows.

Figure 1:
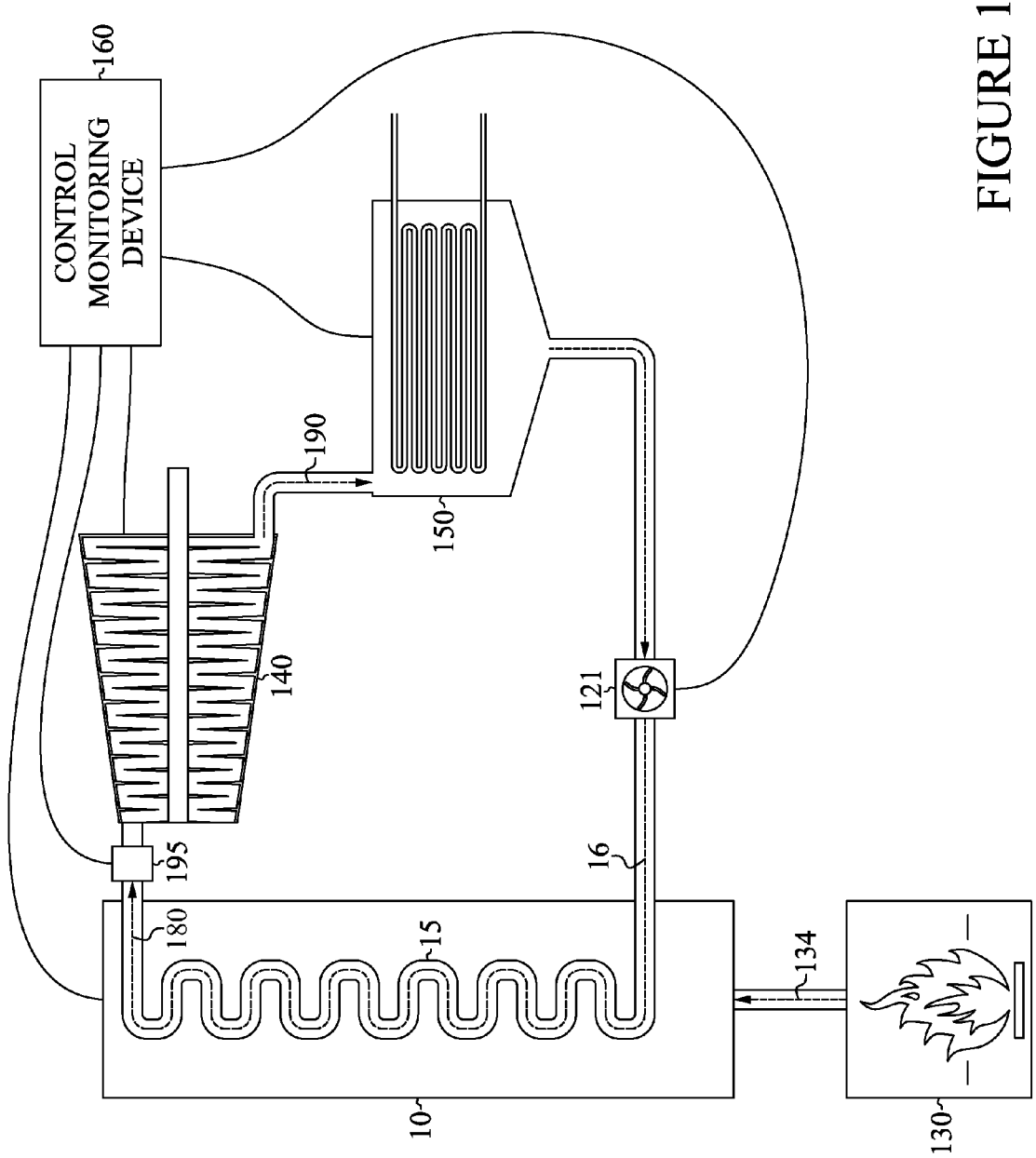
FIG. 1 depicts a schematic of an illustrative system for producing shaft horsepower according to one or more embodiments

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

In one or more embodiments of the system a heat recovery silencer can be integrated or operatively connected to a boiler or engine of a back up electric generation system of a building or facility. In one or more embodiments, the boiler or backup electric generation system can be a furnace or other combustion source in a chemical plant.

The heat recovery silencer can provide waste heat to a heat transfer fluid to create steam and drive a turbine to generate shaft horsepower that can be used to generate auxiliary electricity.

One or more embodiments of the system for generating shaft horsepower using waste heat from combustion exhaust can include a heat recovery silencer having a heat recovery flow path. The heat recovery flow path can be located between an inner housing and an outer heat recovery housing.

Heat transfer fluid can be provided to an inlet of the heat recovery silencer, and the heat transfer fluid can be heated by the heat recovery silencer until at least a portion of the heat transfer fluid is transformed into a heated vapor.

A turbine can be in fluid communication with the heat recovery flow path. As the heated vapor is passed through the turbine, the heated vapor can turn a shaft, which provides shaft horsepower, and the heated vapor can be transformed into a low pressure vapor stream.

A compressor can be in fluid communication with the heat recovery flow path and the turbine. The compressor can receive the low pressure vapor stream and compress the low pressure vapor stream back into the heat transfer fluid. As such, the compressor reforms the heat transfer fluid.

A pump can be in fluid communication with the compressor and the heat recovery flow path. The pump can transfer or flow the heat transfer fluid from the compressor to the heat recovery silencer.

The first silencing chamber can be in fluid communication with an inlet of the inner housing. For example, exhaust gas from a combustion system can flow into the inlet of the first silencing chamber and then flow into the inner housing. In one or more embodiments, the inner housing can have an inlet remote or adjacent the first silencing chamber, and the inlet can be in communication with the combustion system and the first chamber. For example, one or more flow paths can be provided between the inlet of the inner housing and the first chamber by one or more openings formed in the inner housing. In one or more embodiments, one or more additional chambers or devices can be integrated or connected with the inner housing.

The second silencing chamber can be in fluid communication with the first silencing chamber. For example, a flow path or communication path can be formed between the first silencing chamber and the second silencing chamber by one or more tubes, channels, valves, ports, or any combination thereof. In one or more embodiments, one or more baffle tubes can be in fluid communication with the first silencing chamber and the second silencing chamber and provide fluid communication therebetween.

The third silencing chamber can be in fluid communication with two or more vectoring tubes. The vectoring tubes can be in fluid communication with the second silencing chamber. Accordingly, fluid or gas, such as exhaust from a combustion system, can flow from the second silencing chamber to the third silencing chamber through the vectoring tubes.

The vectoring tubes can provide spiraling flow to the gas or fluid flowing therethrough. The vectoring tubes can prevent or minimize back pressure to the third silencing chamber. The third chamber and second chamber can be in fluid communication with from about 2 to about 100 vectoring tubes. For example, two vectoring tubes can be used to provide fluid communication between the third silencing chamber and the second silencing chamber. Accordingly, the contact between the gas or fluid and the inner surface of the inner housing in the third chamber can be optimized or maximized.

A vent can be in fluid communication with the third silencing chamber and an environment exterior thereto. The vent can include one or more flow control devices for controlling the rate of gas or fluid allowed to flow therethrough. The exterior of environment can be the atmosphere.

The heat recovery outer housing can be disposed about the inner housing. In one or more embodiments, the outer housing can encapsulate the inner housing.

The heat recovery flow path, such as a channel, space, or chamber, can be formed between the heat recovery outer housing and the inner housing.

In one or more embodiments, the first silencing chamber can be in fluid communication with a conduit, such as a half pipe. The conduit can also be in fluid communication with the third silencing chamber. Accordingly, the conduit can provide a flow path between the first silencing chamber and the third silencing chamber for at least a first portion of the gas or fluid, such as exhaust, in the first silencing chamber. The conduit can help maintain a differential pressure between the third silencing chamber and the first silencing chamber. As such, a second portion of the gas or fluid, which can be larger than the first portion of the gas or fluid, will be able to flow from the first silencing chamber to the second silencing chamber, and from the second silencing chamber to the third silencing chamber.

The conduit can be secured to an outer surface of the inner housing, and an exterior portion of the conduit can be disposed or located within the heat recovery flow path. As such, the conduit can also maximize or increase the heat transferred from the gas or fluid in the inner housing with a gas or fluid in the heat recovery flow path.

In one or more embodiments, the heat recovery silencer can include a diffuser adjacent or in fluid communication with the first silencing chamber. The diffuser can provide a velocity drop and a direction change to the gas or fluid as the gas or fluid enters the heat recovery silencer.

The heat recovery silencer can also include a diffusion chamber disposed between the diffuser and the first silencing chamber. The diffusion chamber can be in fluid communication with the diffuser and the first silencing chamber.

In addition, one or more embodiments of the heat recovery silencer can be or include a catalyst element disposed or located between the diffuser chamber and the first silencing chamber. The catalyst element can be in fluid communication with the first silencing chamber and the diffuser chamber.

The catalyst element includes the catalyst device and the catalyst housing.

The catalyst device can be a plurality of sheets having a catalyst coating. The sheets can be wrapped around one another and a space can be formed between the sheets to allow exhaust gas or fluid to flow therebetween.

The catalyst device can include a metal group catalyst. The metal group catalyst can include platinum, ruthenium, palladium, or other metal group catalysts.

In an embodiment, the catalyst device can include a plurality of layers of metal group catalyst and a space or flow area can be located between each layer.

The catalyst element can receive a gas or fluid flowing from the combustion system to the first silencing chamber and provide a catalytic reduction or reaction to the gas or fluid flowing therethrough. The catalytic reaction can reduce NOX gas, volatile organic compounds, formaldehyde, or combinations thereof in the gas or fluid.

As such, the catalyst element can receive a gas or fluid flowing from the inlet to the first chamber and can provide a catalytic reaction to the gas or fluid flowing therethrough. As such, the catalyst element can reduce NOX gas, volatile organic compounds, formaldehyde, or combinations thereof in the gas or fluid.

The catalyst device can be disposed within a catalyst housing. The catalyst housing can include an opening and an access cover disposed over the opening. The access cover can be mounted to the catalyst housing with a hinge. In addition, the catalyst housing can have a radius of curvature and the access cover can have a radius of curvature allowing the access cover to fit over at least a portion of the catalyst housing and seal the opening.

The catalyst housing can include four moveable pressure sealing bars, a catalyst element seating ring formed into the catalyst housing, and a seal plate. The four movable pressure sealing bars can be configured to push the catalyst device against the seal plate to form a pressure seal, which causes the exhaust gas to only flow through the catalyst element.

The heat recovery silencer can silence or muffle noise associated with a combustion exhaust system. In addition, the heat recovery silencer can reduce risks associated with multiple combustion systems by efficiently removing waste heat from exhaust gas of a combustion system, which allows waste heat to be used to generate electricity.

The system can be best understood with reference to the Figures. FIG. 1 depicts a schematic of an illustrative system for creating electricity by using a heat recovery silencer 10 according to one or more embodiments. The system can include the heat transfer silencer 10, a high pressure pump 121, a combustion system 130, a turbine 140, compressor (Not shown), and a control system 160 in communication with at least one of the heat transfer silencer 10, the high pressure pump 121, the combustion system 130, the turbine 140, and a condenser 150.

The combustion system 130 can be a system used to perform a first task. For example, the combustion system 130 can be a combustor for burning methane recovered from a land fill, an engine used to create energy for a building or municipality, or similar devices or systems.

The combustion system 130 can have an exhaust system 132, such as a chimney, in fluid communication with the heat recovery silencer 10.

In one or more embodiments, the heat recovery silencer 10 can have an inner housing 12. A heat recovery outer housing 16 can be disposed about the inner housing 10, and a heat recovery flow path 15 can be formed therebetween. The heat recovery flow path 15 can be in fluid communication with the high pressure pump 121 and the turbine 140.

The high pressure pump 121 can be an electrical pump or a hydraulic pump. The high pressure pump 121 can provide a pump head of about 20 psig to about 180 psig. For example, the high pressure pump 121 can provide a pump head of about 150 psig.

The turbine 140 can be any turbine that produces shaft horsepower while expanding heated vapor to a low pressure vapor stream. For example, the turbine 140 can be a turbo expander. The turbine 140 can be configured to produce a shaft horsepower ranging from about 20 horsepower to about 350 horsepower. The turbine 140 can be in fluid communication with the condenser 150.

The compressor (Not shown) can be any compressor used in the art.

In operation, the inner housing 12 of the heat recovery silencer 10 can be in fluid communication with the combustion system 130. As such, the inner housing 12 can receive an exhaust gas 134 from the combustion system 130.

The heat recovery flow path 15 can have a heat transfer fluid 16 flowing therein. The heat transfer fluid 16 can be treated water, biomedia, refrigerants, or combinations thereof. The biomedia can be a propane, a butane, a heptane, a nonane, an octane, or combinations thereof. The treated water can be deionized water, water treated with corrosion inhibitors, reverse osmosis water, or combinations thereof.

Accordingly, the heat transfer fluid 16 can be heated by indirect heat exchange from the exhaust gas 134 flowing within the inner housing 12. The heat transfer fluid 16 can flow in the heat recovery flow path 15 in a direction that is the same or counter to the flow of the exhaust gas 134 in the inner housing. The heat transfer fluid 16 can be transformed or heated to a heated vapor 180 as it flows through the heat recovery flow path 15.

The heated vapor 180 can exit the heat recovery silencer 10 and flow to the turbine 140. The flow rate of the heated vapor 180 to the turbine 140 can be controlled by a flow control device 195. The flow control device 195 can be one or more valves, such as butterfly valves. As the heated vapor 180 flows through the turbine 140 the heated vapor 180 can create shaft horsepower and expand to a low pressure vapor stream 190.

The low pressure stream 190 can flow to the condenser 150, and the condenser 150 can transform the low pressure vapor stream 190 back to the heat transfer fluid 16. Accordingly, the heat transfer fluid 16 can be re-circulated back to the heat recovery flow path 15 by the high pressure pump 121.

The control system 160 can acquire data related to the system, while controlling one or more components of the system at the same time. For example, the control system 160 can measure the flow rate of the heat transfer fluid out of the condenser 150, the flow rate of heated vapor from the heat recovery silencer 10, the shaft horsepower produced by the turbine 140, and the pressure of the high pressure pump 121. In addition, the control system 160 can control the flow rate of the heated vapor 180 to the turbine 140 by adjusting the flow control device 195.

Figure 2:
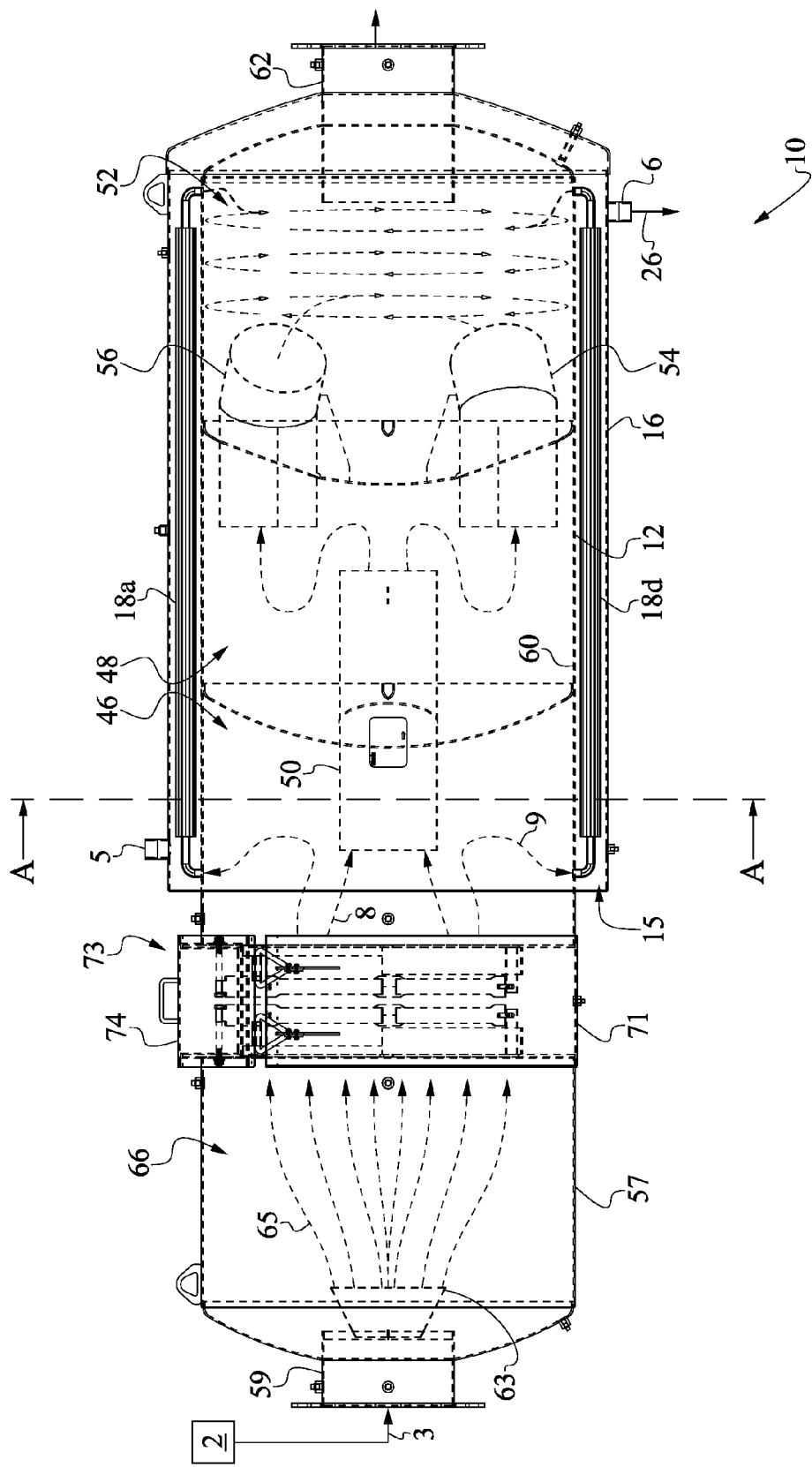
FIG. 2 depicts a side view of an illustrative heat recovery silencer according to one or more embodiments.
Figure 3:
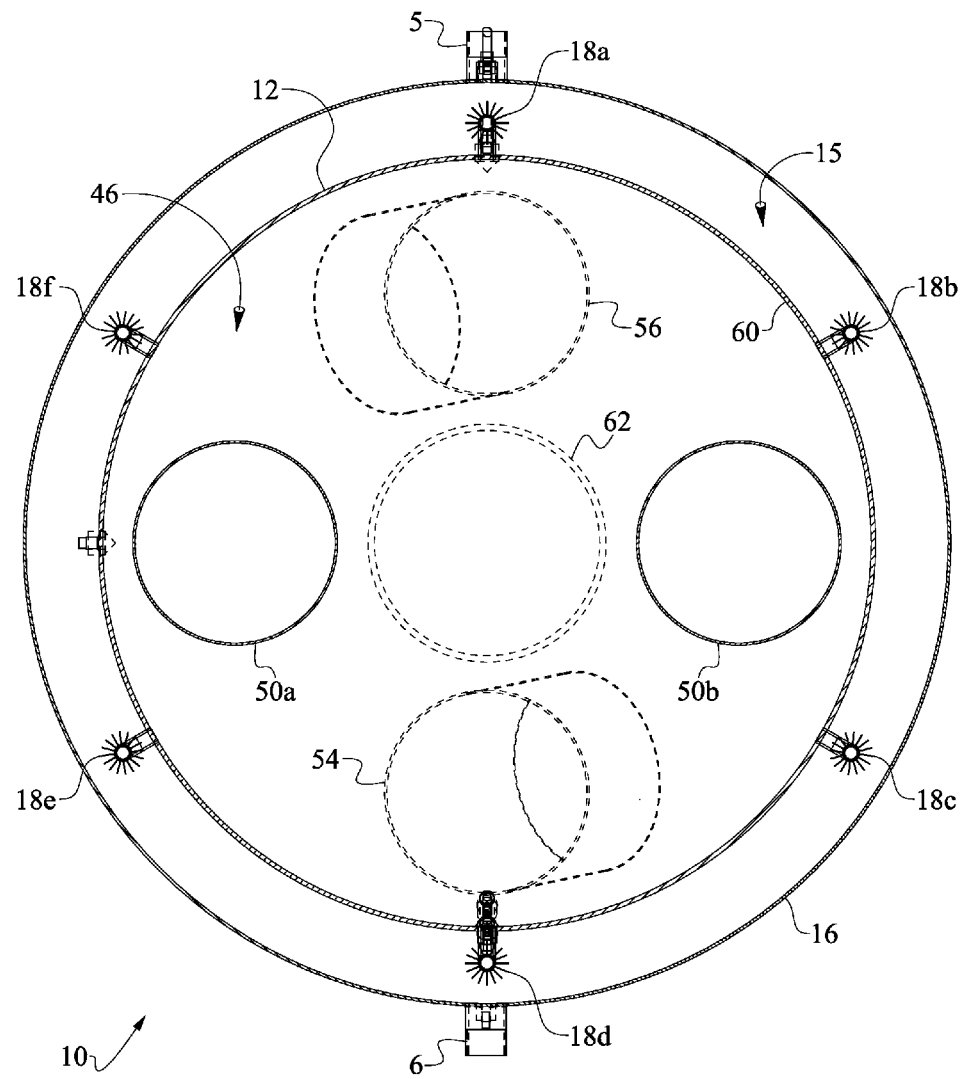
FIG. 3 depicts a cross sectional view of the heat recovery silencer of FIG. 1 along line A-A according to one or more embodiments.

Referring now to FIGS. 2 and 3. A heat recovery silencer 10 is depicted having an inner housing 12, a heat recovery outer housing 16, a heat recovery flow path 15 disposed or formed between the inner housing 12 and the heat recovery outer housing 16, a catalyst element 73, an access cover 74, a diffuser housing 57, a diffuser chamber 66, a diffuser inlet 59, and a diffuser 63. Although the heat recovery silencer 10 is depicted in a horizontal position, the heat recovery silencer 10 can be oriented in an position and mounted in multiple ways. For example, the heat recovery silencer 10 can be oriented in a vertical configuration. One skilled in the art with the aid of this disclosure would be able to mount and position the heat recovery silencer 10 in any number of ways without undue experimentation.

The heat recovery outer housing 16 can be concentric with the inner housing 12. The heat recovery outer housing 16 can at least partially encapsulate the inner housing 12. The heat recovery outer housing 16 can be made from steel, carbon steel, ceramic, or other material capable of withstanding high temperatures. The heat recovery outer housing 16 can have one or more ports (two are shown as 5 and 6) formed therethrough.

The inner housing 12 can have three or more silencing chambers (three are shown as 46, 48, and 52) formed or located therein. The first silencing chamber 46 can be in fluid communication with an exhaust source. For example, an inlet, such as a diffuser inlet 59, can be connected to the inner housing 12 and in fluid communication with the first silencing chamber 46. One or more components can be located between the diffuser inlet 59 and the first silencing chamber 46 (as shown). The diffuser inlet 59 can be in direct fluid communication with the first silencer chamber 46.

The first silencing chamber 46 can also be in fluid communication with a second silencing chamber 48. For example, one or more baffle tubes (two are shown as 50a and 50b) can be in fluid communication with the first silencing chamber 46 and the second silencing chamber 48. The baffle tubes 50a and 50b can provide a flow path between the first silencing chamber 46 and the second silencing chamber 48.

The second silencing chamber 48 can be in fluid communication with a third silencing chamber 52. For example, one or more vectoring tubes (two are shown 54, 56) can be in fluid communication with the second silencing chamber 48 and the third silencing chamber 52. The vectoring tubes 54, 56 can provide a flow path between the second silencing chamber 48 and the third silencing chamber 52. The third silencing chamber 52 can be in fluid communication with a vent 62, which can be in fluid communication with an external environment.

The heat recovery flow path 15 can be a chamber, a channel, a space, a niche or other void between the inner housing 12 and the heat recovery outer housing 16. The heat recovery flow path 15 can be in fluid communication with the ports 5 and 6. The ports 5 and 6 can allow fluid to enter and exit the heat recovery flow path 15.

The inner housing 12 can have the catalyst element 73 disposed adjacent or connected thereto. The catalyst element 73 can include a catalyst housing 71 and a catalyst device disposed therein (as shown below in FIGS. 4A and 4B).

The diffuser housing 57 can be disposed adjacent and connected to the catalyst housing 71. The diffuser housing 57 can have a diffuser chamber 66 located therein. The diffuser chamber 66 can be in fluid communication with the first silencer chamber 46 and the diffuser inlet 59.

The diffuser 63, such as a conical diffuser, a baffle plate, a flow tube, or similar device that provides a velocity change to a flowing fluid or gas, can be located between the diffuser chamber 66 and the diffuser inlet 59. In one or more embodiments, the diffuser 63 can at least partially protrude into the diffuser chamber 66.

In operation, the diffuser inlet 59 can be placed in fluid communication with an exhaust of a combustion system 2. A high velocity exhaust gas stream 3 can flow from the exhaust of the combustion system 2 to the diffuser inlet 59.

The high velocity exhaust gas stream 3 can pass through the diffuser 63. The diffuser 63 can cause the velocity of the high velocity exhaust gas stream 3 to change. For example, the diffuser 63 can slow down and provide a direction change to the high velocity exhaust gas stream 3.

Accordingly, the high velocity exhaust gas stream 3 can be transformed to a low velocity exhaust gas stream 65 as it passes through the diffuser 63 and enters the diffuser chamber 66.

The low velocity exhaust gas stream 65 can flow through the diffuser chamber 66 into the catalyst housing 71. As the low velocity exhaust gas stream 65 passes through the catalyst housing 71.

The low velocity exhaust gas stream 65 can flow from the catalyst housing 71 to the first silencing chamber 46. A first portion 8 of the low velocity exhaust gas stream 65 can flow from the first silencing chamber 46 to the second silencing chamber 48 via the baffle tubes 50a and 50b. A second portion 9 of the low velocity exhaust gas stream 65 can flow from the first silencing chamber 46 to the third silencing chamber 52 through a conduit 18a, 18b, 18c, 18d, 18e, and 18f.

The first portion 8 of the low velocity exhaust stream 65 can flow from the second silencing chamber 48 to the third silencing chamber 52 via the vectoring tubes 54 and 56. As the first portion 8 of the low velocity exhaust gas stream 65 passes through vectoring tubes 54 and 56, the vectoring tubes 54 and 56 can impart a spiral flow to the first portion 8 of the low velocity exhaust gas stream 65 as it enters the third silencing chamber 52.

As such, back pressure and contact in the third silencing chamber 52 can be reduced in an inner surface 60 of the inner housing 12. The first portion 8 of the low velocity exhaust gas stream 65 entering the third silencing chamber 52 can be increased because of the reduction in back pressure and contact. The first portion 8 of the low velocity exhaust gas stream 65 can mix with the second portion 9 of the low velocity exhaust stream 65 in the third silencing chamber 52.

The first portion 8 and the second portion 9 of the low velocity exhaust gas stream 65 can exit the third silencing chamber 52 via the vent 62.

As the low velocity exhaust gas stream 65 flows through the inner housing 12, a heat transfer fluid 16, such as a diethylene glycol, a purified water, a triethylene glycol, a synthetic oil (300-600 F without degrading), a silicon fluid, a refrigerant, or other fluid, can enter the heat exchange flow path 15 via the right port 6 and flow to the left port 5.

As the heat transfer fluid 16 flows from the right port 6 to the left port 5, indirect heat exchange can occur between the low velocity gas exhaust stream 65 and the heat transfer fluid 16. Accordingly, the heated heat transfer fluid 26, which can be a vapor or liquid, can exit the left port 5 and be provided to an end use.

Figure 4A:
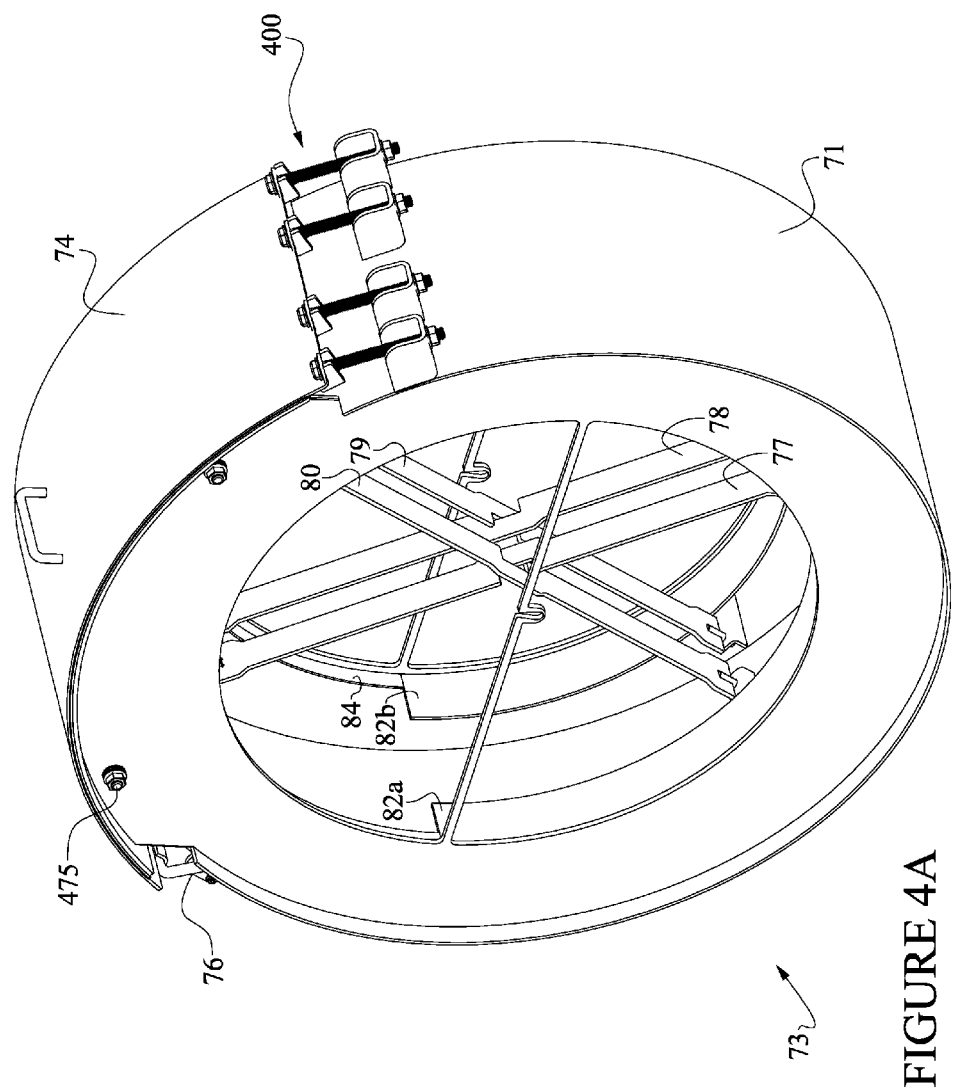
FIG. 4A depicts an illustrative catalyst housing usable with the heat recovery silencer according to one or more embodiments.
Figure 4B:
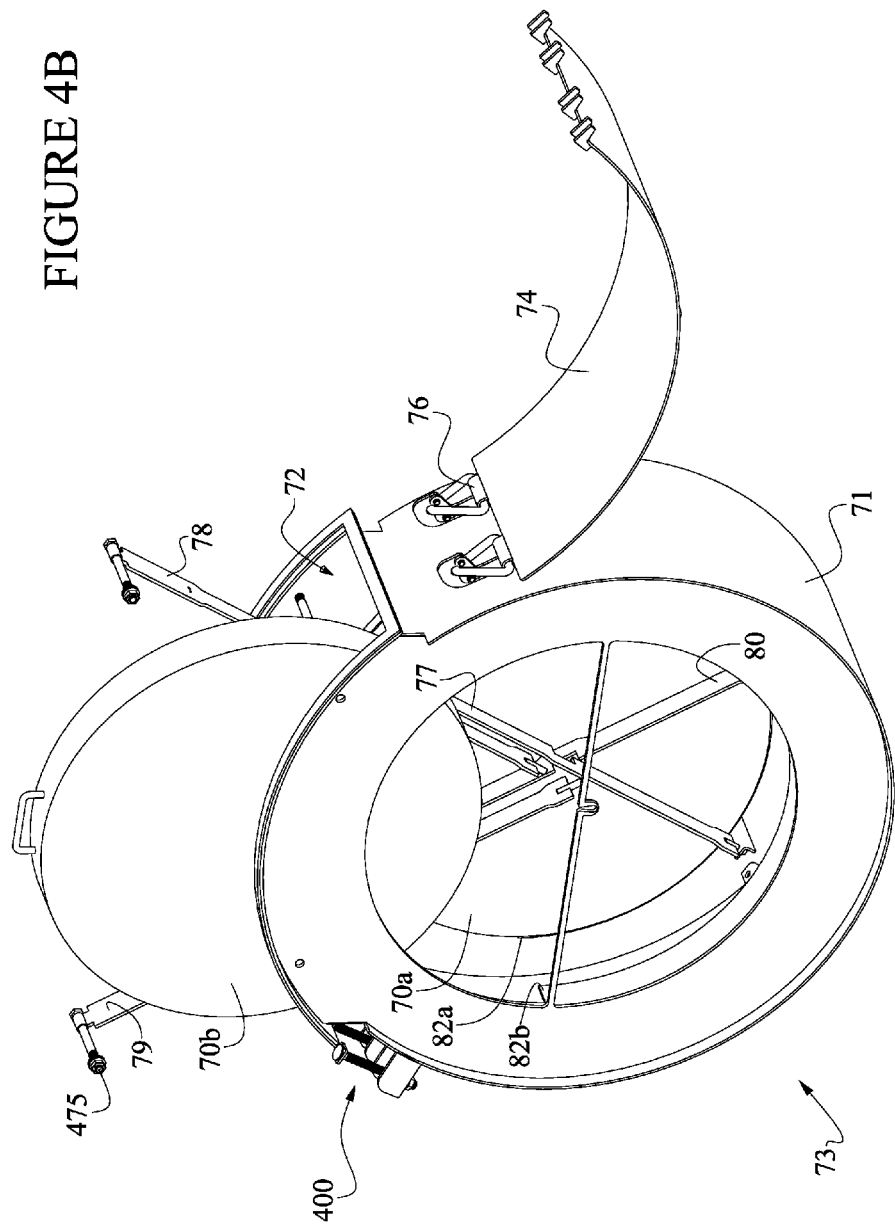
FIG. 4B depicts an illustrative view of the catalyst housing of FIG. 4A having a catalyst device disposed therein.

FIG. 4A depicts a catalyst housing 71 usable with the heat recovery silencer 10 according to one or more embodiments. FIG. 4B is a view of the catalyst element 73 having a catalyst devices 70a and 70b being disposed therein. The catalyst element 73 can include the catalyst housing 71. The catalyst housing 71 can include one or more seating rings (two are shown as 82a and 82b), one or more housing seal plates 84, an access cover 74, an opening 72, and at least four moveable pressure sealing bars 77, 78, 79, and 80.

The opening 72 can allow one or more catalyst devices 70a and 70b to be placed into the catalyst housing 71. The opening 72 can be blocked or sealed by the access cover 74. The access cover 74 can be mounted to the catalyst housing 71 by the hinge 76. When the access cover 74 seals the opening 72, a lock mechanism 400 can be used to secure the access cover 74 in place.

The catalyst element can sit on the seating rings 82a and 82b, and the seating rings 82a and 82b can ensure proper positioning of the catalyst devices 70a and 70b within the catalyst housing 71.

The at least four moveable pressure sealing bars 77, 78, 79, and 80 can be fixed at one end. The other end of the at least four moveable pressure sealing bars 77, 78, 79, and 80 can be moved to press one or more of the catalyst devices against the seal plate 84 by a tightening device 475. Accordingly, a pressure seal can be formed between the seal plate 84 and the catalyst devices.

Figure 5:
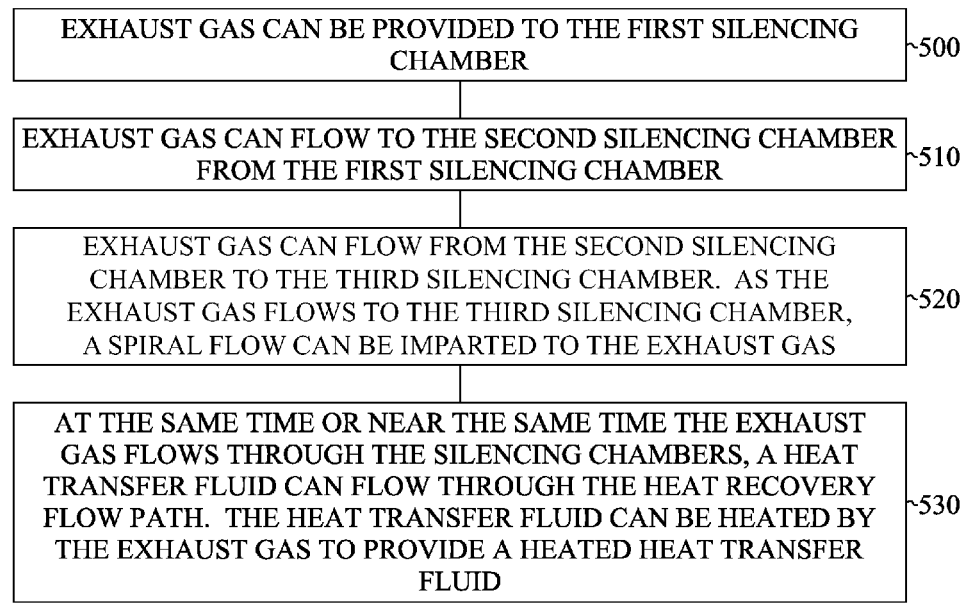
FIG. 5 depicts a flow diagram for an illustrative method of using the heat recovery silencer according to one or more embodiments.

FIG. 5 depicts a flow diagram for an illustrative method of using the heat recovery silencer according to one or more embodiments.

At box 500, exhaust gas can be provided to the first silencing chamber. At box 510, the exhaust gas can flow to the second silencing chamber from the first silencing chamber.

At box 520, the exhaust gas can flow from the second silencing chamber to the third silencing chamber. As the exhaust gas flows to the third silencing chamber, a spiral flow can be imparted to the exhaust gas.

At the same time or near the same time the exhaust gas flows through the silencing chambers, a heat transfer fluid can flow through the heat recovery flow path. The heat transfer fluid can be heated by the exhaust gas to provide a heated heat transfer fluid, as depicted at box 530. For example, the heat transfer fluid can be heated by the exhaust gas by indirect heat transfer.

While these embodiments have been described with emphasis on the embodiments, it should be understood that within the scope of the appended claims, the embodiments might be practiced other than as specifically described herein.

What is claimed is:

1. A system for generating shaft horsepower by using waste heat from combustion exhaust, wherein the system comprises:
   a. a heat recovery silencer comprising:
      (i) a heat recovery outer housing disposed about an inner housing, wherein the inner housing comprises:
         1. a first silencing chamber having an inlet at one end;
         2. a second silencing chamber in fluid communication with the first silencing chamber;
         3. a third silencing chamber in fluid communication with two vectoring tubes, wherein the two vectoring tubes are in fluid communication with the second silencing chamber; and
         4. a vent in fluid communication with the third silencing chamber, and wherein the vent is in fluid communication with an environment exterior of the third silencing chamber; and
         5. a conduit in fluid communication with the first silencing chamber and the third silencing chamber, wherein the conduit is connected to an exterior portion of the inner housing,
      (ii) a heat recovery flow path formed between the heat recovery outer housing and the inner housing, wherein a portion of the conduit is disposed in the heat recovery flow path;
   b. a turbine in fluid communication with the heat recovery flow path;
   c. a condenser in fluid communication with the turbine; and
   d. a pump in fluid communication with the condenser and the heat recovery flow path of the heat recovery silencer.

2. The system of claim 1, wherein the fluid communication between the first silencing chamber and the second silencing chamber is provided by a baffle tube.

3. The system of claim 1, wherein the fluid communication between the first silencing chamber and the second silencing chamber is provided by a plurality of baffle tubes.

4. The system of claim 1, further comprising a diffuser chamber in fluid communication with the inlet of the first silencing chamber, and wherein the diffuser chamber has a diffuser inlet.

5. The system of claim 4, further comprising a diffuser in fluid communication with the diffuser inlet and the diffuser chamber.

6. The system of claim 5, further comprising a catalyst element comprising a housing and a removable catalyst device disposed within the housing, wherein the catalyst housing is disposed between the diffuser chamber and the first silencing chamber, and wherein the catalyst element is in fluid communication with the first silencing chamber and the diffuser chamber.

7. The system of claim 6, wherein the catalyst device comprises a metal group catalyst.

8. The system of claim 7, wherein the metal group catalyst is platinum, ruthenium, palladium, or combinations thereof.

9. The system of claim 6, wherein the catalyst housing comprises an opening and an access cover disposed over the opening.

10. The system of claim 9, wherein the access cover is mounted to the catalyst housing with a hinge.

11. The system of claim 10, wherein at least a portion of the catalyst housing has a radius of curvature.

12. The system of claim 11, wherein the access cover has a radius of curvature allowing the access cover to seal the opening.

13. The system of claim 6, wherein the catalyst housing further comprises four moveable pressure sealing bars wherein the sealing bars are connected to the catalyst housing at a first end and a tightening device at a second end, wherein a catalyst element seating ring is formed into the catalyst housing, wherein a seal plate is formed on a side of the catalyst housing, and wherein the four movable pressure sealing bars are configured to push the sealing element against the seal plate.

14. The system of claim 1, wherein the turbine is a turbo expander.

15. A system for generating shaft horsepower by using waste heat from combustion exhaust, wherein the system comprises:
   a. a heat recovery silencer comprising:
      (i) a heat recovery outer housing encapsulating an inner housing forming a heat recovery flow path for exchanging heat from an exhaust gas in the inner housing with a heat transfer fluid in the heat recovery flow path, wherein the heat transfer fluid is transformed into a heated vapor as it passes through the heat recovery flow path;
      (ii) a first silencing chamber located within the inner housing in fluid communication with an inlet of the inner housing, wherein a diffuser is adjacent the first silencing chamber, and wherein a catalyst element comprises a housing and a removable catalyst device disposed within the housing, wherein the catalyst housing is disposed between the diffuser chamber and the first silencing chamber, and wherein the catalyst element is in fluid communication with the first silencing chamber and the diffuser chamber;
      (iii) a second silencing chamber within the inner housing in fluid communication with the first silencing chamber;
      (iv) a baffle tube for providing fluid communication between the first silencing chamber and the second silencing chamber;
      (v) a third silencing chamber within the inner housing, wherein the third silencing chamber is in fluid communication with two vectoring tubes, wherein the vectoring tubes are in fluid communication with the second silencing chamber; and
      (vi) a vent in fluid communication with the third silencing chamber and an environment external to the inner housing;
   b. a turbine for receiving the heated vapor from the heat recovery silencer, wherein the turbine transforms the heated vapor to a low pressure vapor stream;
   c. a condenser for receiving the low pressure vapor stream, wherein the condenser reforms the heat transfer fluid; and
   d. a pump in fluid communication with the condenser and the heat recovery flow path for pumping the heat transfer fluid from the condenser to the heat recovery silencer.

16. The system of claim 15, wherein the heat transfer fluid is a biomedia, treated water, refrigerants, or combinations thereof.

17. The system of claim 15, wherein the heat transfer fluid is a biomedia.

18. The system of claim 17, wherein the biomedia is a member of the group consisting of: propane, butane, heptane, nonanes, octanes, and combinations thereof.

* * * * *